United States Patent [19]

Sweeney et al.

[11] Patent Number: 4,484,861
[45] Date of Patent: Nov. 27, 1984

[54] METHOD AND APPARATUS FOR PROCESS CONTROL OF VERTICAL MOVEMENT OF SLURRIED PARTICULATES

[75] Inventors: William T. Sweeney, Ponca City, Okla.; Rick L. Shaw; Frederick A. Webb, both of Bethel Park, Pa.

[73] Assignee: Conoco Inc., Ponca City, Okla.

[21] Appl. No.: 351,102

[22] Filed: Feb. 22, 1982

[51] Int. Cl.$^3$ .............................................. F04B 49/00
[52] U.S. Cl. ........................................ 417/15; 417/63; 417/244
[58] Field of Search ................. 417/244, 15, 223, 212, 417/44, 45, 319, 900; 60/351, 347

[56] References Cited

U.S. PATENT DOCUMENTS

| | | | |
|---|---|---|---|
| 1,406,377 | 2/1922 | Harvey | 417/45 |
| 2,768,501 | 10/1956 | Muller | 417/223 |
| 3,155,040 | 11/1964 | Shurts et al. | 417/223 |
| 3,982,789 | 9/1976 | Funk | 406/105 |
| 4,170,438 | 10/1979 | Kondo et al. | 417/223 |
| 4,204,808 | 5/1980 | Reese et al. | 417/15 X |

Primary Examiner—Edward K. Look
Attorney, Agent, or Firm—William J. Miller

[57] ABSTRACT

A process control system for use in movement of slurry material from a first lower level through a vertical flow way to an upper or surface level. In particular, this system is utilized for moving slurried particulate from a subterranean mine level upward through a vertical flow way such as an earth borehole to a surface pumping station or the like. The vertical pump system includes series-connected pumps having variable speed capabilities at the lower level, and the pumps then direct the slurried material through the vertical flow way to an upper level receiving station. The process control monitors the upper level volume, the slurry line pressure in the pipeline underground, and the flow rate in the pipeline underground thereby to select a controller output signal. The output signal is then utilized to control a hydraulic servo mechanism which adjusts the variable speed drive to one or more of the series-pumps thereby to maintain a proper flow rate and pressure through the vertical flow way.

6 Claims, 3 Drawing Figures

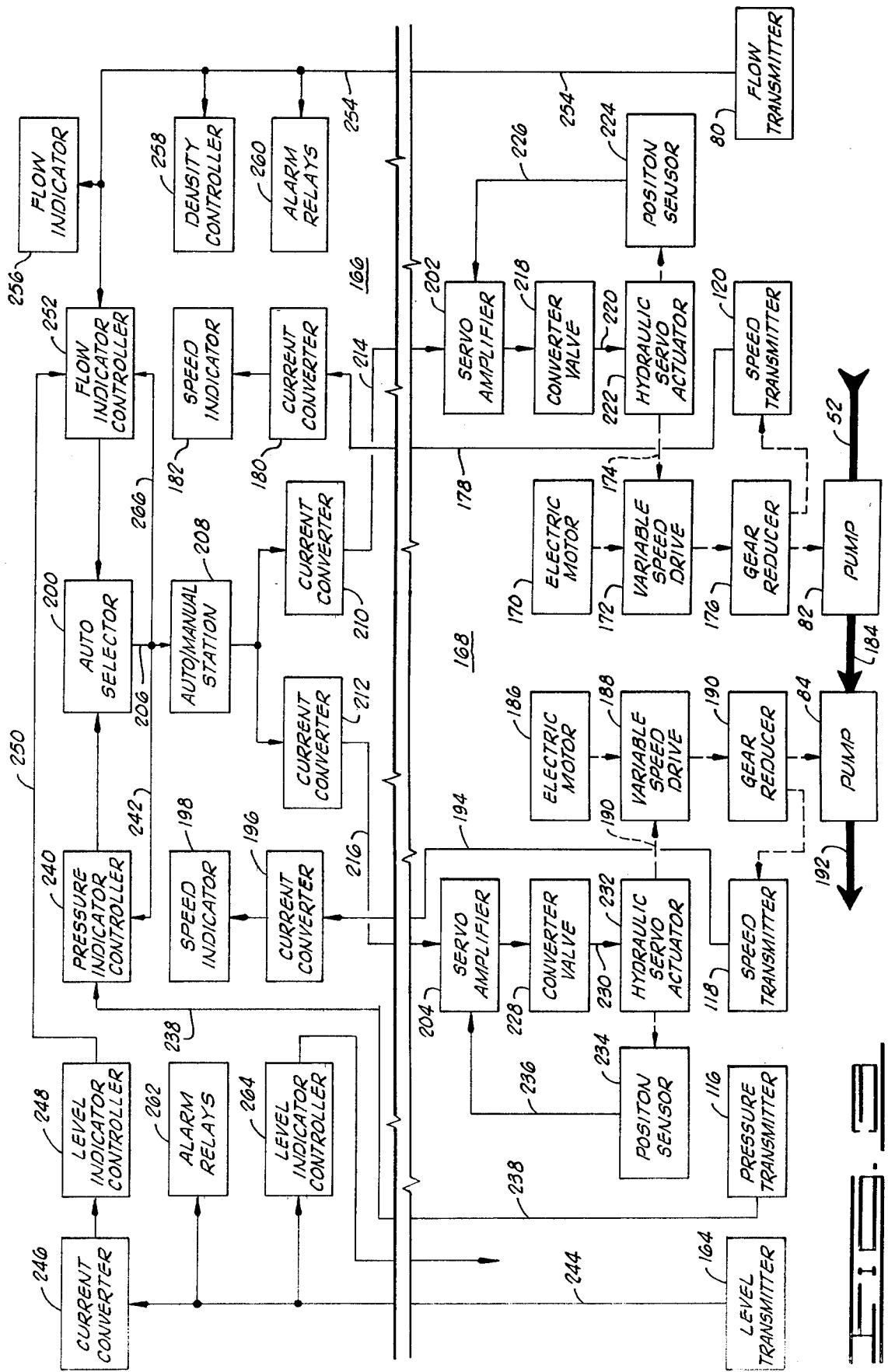

METHOD AND APPARATUS FOR PROCESS CONTROL OF VERTICAL MOVEMENT OF SLURRIED PARTICULATES

BACKGROUND OF THE INVENTION

1. Field of the Invention

The invention relates generally to vertical pumping of slurries of particulate matter and, more particularly, but not by way of limitation, it relates to a vertical hoist pumping system and associated process control for moving coal slurry over appreciable vertical distances.

2. Description of the Prior Art

The prior art includes numerous forms of short distance vertical pumping equipment as utilized in diverse manufacturing and mining processes; however, there are but few comparable vertical pumping systems which are intended for moving slurried material from an integrally associated mine slurry system through a vertical earthen or cased borehole of considerable length for operative connection to an overland slurry transport system. U.S. Patent 3,982,789 to Funk teaches vertical pipelining of slurry from a mine sump upward to surface processing equipment. The system utilizes a rotary gate metering system in combination with a centrifugal pump to transmit slurried heavies while fines are separately collected for introduction into the vertical pipeline. Vertical pipelining in general has also been employed in several German mine systems; however Applicant has no knowledge of any prior process control similar to the present system.

SUMMARY OF THE INVENTION

The present invention relates to improvements in the pump movement of slurried material through a vertical flow way and the associated process control for maintaining flow pressure, flow rate and delivery rate within requisite limits during continuous operation. The vertical pump system includes series-connected pumps having variable speed capability and receiving slurried material from a mine system at a first level, and the pumps thereafter direct the slurried material through a flow way such as a borehole up to a surface or second level whereupon the slurried material is temporarily deposited in a surge tank and thereafter repumped by a surface pump system for overland transport to a distant repository. The process control of the present invention monitors the surge tank slurry level at the second level, slurry line pressure at a point in the pipeline underground, and flow rate in the pipeline underground thereby to select a controller output signal. A selected controller output signal is then utilized to control a hydraulic servo mechanism which adjusts a variable speed drive to one or more of the series-pumps thereby to maintain proper flow rate and pressure of slurry conduction up through the flow way to the surface level surge tank.

Therefore, it is an object of the present invention to provide an improved form of process control for vertical pumping of slurried material.

It is also an object of the present invention to provide a process control which looks at a plurality of slurry flow parameters and automatically selects a control parameter for maintaining the vertical flow rate at a desired level.

It is still further an object of the present invention to provide a pump pressure control system utilizing variable speed pump drive which is more easily controlled and susceptible of close surveillance.

Finally, it is an object of the present invention to provide a process control system for a variable speed pump system which eliminates the need for additional servo considerations necessary for speed sensing servo control of such variable speed pump mechanisms.

Other objects and advantages of the invention will be evident from the following detailed description when read in conjunction with the accompanying drawings which illustrate the invention.

BRIEF DESCRIPTION OF THE DRAWINGS

FIG. 3 is a block diagram of the process control apparatus as utilized in the present invention.

DETAILED DESCRIPTION OF THE INVENTION

Figure 1:
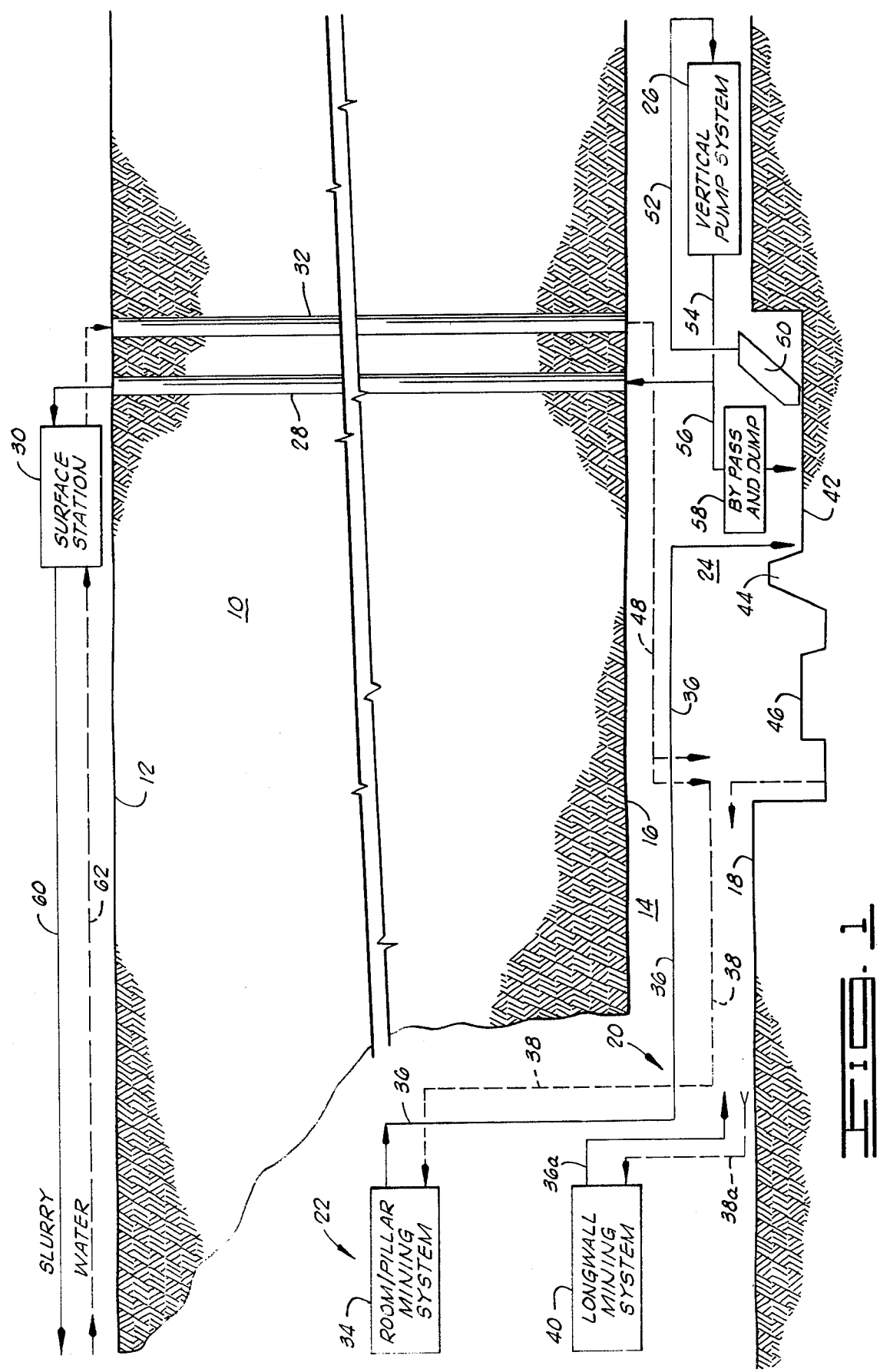
FIG. 1 is an idealized block diagram of a mining system including surface and mine tunnel installations.

FIG. 1 illustrates a total slurry mining system in an earth section 10 having a surface 12 and mine tunnel 14 as defined by tunnel roof 16 and floor 18. It should be understood, of course, that in the very large coal mines there may be a number of tunnels 14 on a plurality of different subsurface levels. In particular, the illustration of FIG. 1 includes an interconnect piping system 20 which provides water-slurry transportation interconnection between a plurality of mining stations 22 and a centrally located sump 24, a repository for coal slurry and subsequent entry into the vertical pump system 26 which moves the slurry vertically through a borehole 28, e.g. earthen, cased or the like, to a surface station 30. Water supply from surface station 30 is also returned downward through a borehole 32 for replenishment to the interconnect system 20 and sump 24.

The mining stations 22 consist of plural different coal removal stations throughout the tunnel 14; thus, stations 22 may include a room and pillar installation 34, such system consisting of a mining machine at the coal face in communication with a slurry hopper and an extensible hose system in interconnection with a slurry line 36 and return water line 38 of interconnect system 20. In like manner, a long wall mining installation 40 may also connect into interconnect system 20. The long wall mining machinery is also a well-known type consisting of a long wall mining machine in communication with a coal conveyor and slurry injection skid in connection with slurry line 36a and return water line 38a. Since the length of slurry lines 36 and water lines 38 may be considerable, on the order of miles, booster pump stations are provided as necessary along the extension route of interconnect system 20.

The slurry line 36 and water line 38 extend to the sump 24 which serves as a central collector for the mined material wherein it is once more prepared for vertical movement up through borehole 28. The sump 24 consists of a slurry pit 42 which is separated by an overflow weir 44 from a water and fines pit 46. Sump 24 is actually of elongated rectangular form and may be quite large, on the order of 300 feet long and 20 feet wide. The slurry line 36 is continually dumped into slurry pit 42 and pumps (not shown) remove water from water pit 46 for return to water line 38 of interconnect system 20. Replenishment water, as needed, from borehole 32 is available via supply water line 48 to either water pit 46 or water line 38 as control valving directs.

Slurry from the coal pit 42 is picked up by such as a continuously moving dredge 50 for passage through a slurry line 52 to the vertical pump system 26. Slurry output from the vertical pump system 26 is then applied via a slurry line 54 up through earth borehole 28 to surface station 30. A slurry line 56 also leads to a bypass and dump station 58, apparatus which is actuated in response to certain line conditions, as will be further described.

The surface station 30 includes a surge tank and surface pump system which then provides power for transportation overland via slurry line 60 as system water is returned via water line 62. The slurry line 60 may include a number of booster stations and valving facilities and may extend for a number of miles overland to a final finishing station whereupon washing, grading and the like is carried out prior to further disposition of the particuate material.

Figure 2:
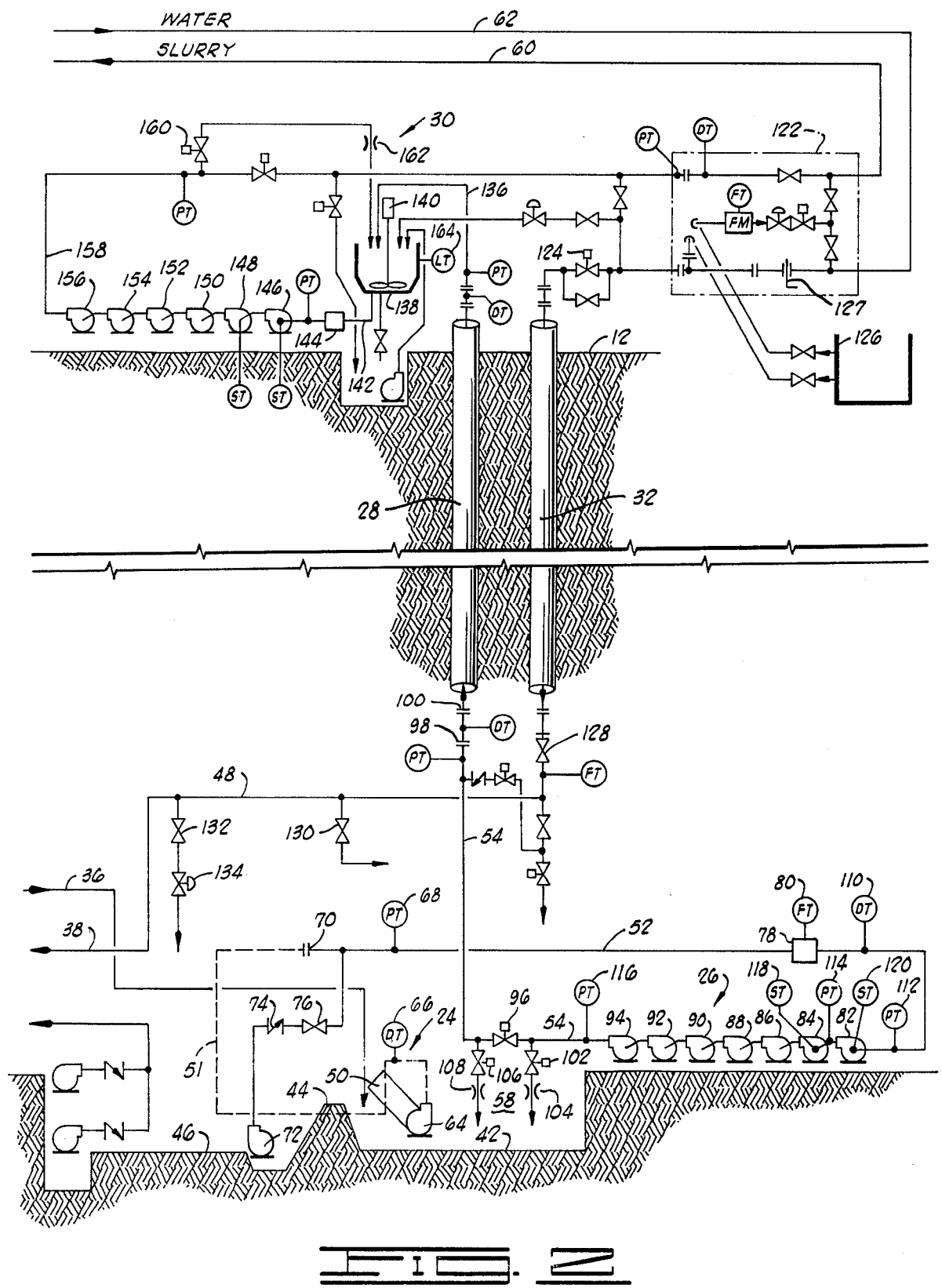
FIG. 2 is a schematic illustration of the vertical pumping system of the present invention including mine level and surface level installations.

FIG. 2 illustrates in greater detail the sump 24 and vertical pump system 26 in interconnection with boreholes 28 and 32 to earth surface 12 and surface station 30. The dredge 50 including dredge pump 64 is controllably moved about slurry pit 42 to pick up slurry for transmission via a flexible line 51 to a slurry line 52 for delivery to the vertical pump system 26. A density transmitter 66 is in communication with the output slurry line 52 and continuously monitors slurry density for indication and control at a central control panel, such control station being located at a suitable disposition adjacent the sump 24 and vertical pump station 26. Also, certain of the operational controls may be remotely accessed from a surface station. A pressure transmitter 68 provides indication of slurry line downstream behind a slurry hose coupling 70 and a weir pump 72 functioning through a check valve 74 and hand-operated valve 76.

Slurry line 52 is then applied through a flow meter 78 having flow transmitter 80, a Fischer and Porter magnetic flow meter, and further conducted for input to the first in a plurality of series-connected pumps. The first two pumps 82 and 84 in the series are variable speed drive pumps, and these operate into constant speed pumps 86, 88, 90, 92 and 94 with final slurry output to slurry ine 54. Each of the pumps 94 is a commercially available type, a Warman Model 14/12 TAHP Slurry Pump. The constant speed pumps 86-94 are each belt-driven by a 500 horsepower electric motor while the variable speed pumps 82 and 84 are driven through a variable speed fluid clutch by 700 horsepower electric motors, as will be further described.

The slurry line output 54 is then conducted through a motor operated valve 96 and further slurry line 54 through flange couplings 98 and 100 into the lower-end of earth borehole 28 for transmission to the surface. A motor operated valve 102 passes slurry to a dissipator 104 during start-up bypass operations, and a motor operated valve 106 passes slurry fluid from the downstream side of valve 96 to a dissipator 108 during emergency dump operations. The dissipator devices 104 and 108 function to provide a high input pressure and reduction in outlet fluid volumetric flow rate when activated.

Control data is transmitted to the central control panel by a plurality of sensor devices. Thus, slurry flow rate through flow meter 78 is sent by a flow transmitter 80, and density information is sent from a density transmitter 66. Pressure transmitters 112, 114 and 116 provide requisite data for each of the pump input, output of first variable speed drive pump 82, and final pump output, and the speed transmiters 118 and 120 provide central control indication of the respective first and second variable speed pumps 82 and 84. The control data outputs at the central control panel also interface with a central logic controller, e.g., a Texas Instruments Model 5T1 Programmable Logic Controller, which functions to carry out various automatic activations.

Primary water supply comes through surface line 62 to a transfer station 122 and proceeds under control of a motor operated valve 124 down the water borehole 32 to the lower level. A very large primary water reservoir 126 is also located near transfer station 122 to receive water flow under control of blind 127. At the second or lower level, water enters through a hand-operated valve 128 to line 48 which then couples to line 38 for interconnect system distribution. A hand-operated valve 130 provides output for auxilliary water uses, and a hand-operated valve 132 through pneumatic valve 134 provides feed system water makeup into pit 46 of sump 24.

The surface station 30 carries out slurry processing and pumping for the overland transport system. Thus, slurry upcoming from borehole 28 is conducted through a slurry line 136 and dumped into surge tank 138 which is constantly agitated by a motor-driven mixer 140. Balanced water supply is also controllably added to surge tank 138 as slurry may be withdrawn via line 142 through a flow meter 144 for entry into the overland pumping system which consists of series-connected pumps, i.e., variable speed pumps 146 and 148 and constant speed pumps 150, 152, 154 and 156. Selected flow output from the pumps is then present on slurry line 158 through transfer station 122 to the overland slurry line 60. A motor-operated valve 160 provides start-up bypass slurry relief through a dissipator 162 which directs reduced slurry flow back into surge tank 138. A level transmitter 164 in communication with surge tank 138 continually monitors slurry level and transmits level information down to the central control panel, as will be further described.

FIG. 3 illustrates the process control system as utilized in the present invention to control the pumping of slurry from vertical system 26 up through the slurry borehole 28. The pumps and parameter transmitters as shown on FIG. 2 are numbered similarly in FIG. 3. It should be understood, too, that all components of the FIG. 3 block diagram are of commercially available types as will be identified hereinafter. Components in sector 166 are located at the central control panel while those components in sector 168 are located at the field equipment stations.

Thus, variable speed pump 82 is driven by an electric motor 170, a commercially available 700 horsepower electric motor of type well known in the industry, and output rotation is coupled to a variable speed drive 172. Variable speed drive 172 is commercially available from American Standard Manufacturing Co. and includes an external speed control rod linkage 174. The variable speed drive 172 is a basic type of torque converter with speed controlled as a function of hydraulic fluid fill which is regulated by a fluid scoop tube in connection to rod linkage 174. Rotational output from variable speed drive 172 is then coupled through a gear reducer 176, a well known and commercially available type of Falk Gear Reducer of the requisite size and gear ratio. Rotational output from gear reducer 176 is then applied to drive the pump 82, a Warman slurry pump as before described. Pump rotational speed is sensed by a speed transmitter 120, an Electro Tachometer utilizing a No. 3030AN Probe, and speed data is transmitted via line 178 to the central control panel for input to current converter 180 and speed indicator 182. Current converter 180 is a Moore Type SCT current to current converter providing output to the speed indicator which is a Fisher Type TL131 that provides panel indication of pump rotation from 0 to 700 RPM.

Slurry output from pump 82 is then conducted via input line 184 to the next succeeding variable speed pump 84. Pump 84 is driven similarly to pump 82 as electric motor 186 provides rotational input to a variable speed drive 188 as controlled by an external rod linkage 190. Rotational output from variable speed drive 188 is then coupled through a gear 190 to provide drive input to the pump 84. Pump 84 then provides slurry output via slurry 192 to the next succeeding pump stage. A speed transmitter 118 senses rotation and provides data transmission via line 194 to the control panel for input to current converter 196 and speed indicator 198.

Each of variable speed drives 188 and 172 is controlled by a servo mechanism responsive to a selected one of the outputs from level transmitter 164, pressure transmitter 116 or flow transmitter 80, as will be described (see also FIG. 2). Thus, a signal originating with an auto-selector 200, a Fisher Type TL-174 Auto-Selector, is applied as input to each of servo amplifiers 202 and 204, Moog Type 121-103 Servo Control Amplifiers, which are directed to control position of control rods 174 and 190 which, in turn, effect speed of respective pumps 82 and 84 in balanced condition. Thus, original auto-selector 200 output on line 206 is applied to an auto/manual station 208, Fisher Type TL-123, which enables manual control access if required. Output from auto/manual station 208 is then applied in parallel to current converters 210 and 212, Moore Type SCT, for the purpose of maintaining current isolation as between the two pump speed servo control systems. Outputs from current converters 210 and 212 via respective lines 214 and 216 to the field are then applied as set point input signals to the respective servo amplifiers 202 and 204.

Set point signal on line 214 is amplified and corrected for error in servo amplifier 202 and output to a converter valve 218, a Moog Type 62-102, which converts a current indication to a flow of hydraulic oil which is applied via line 220 to a hydraulic servo actuator 222. Actuator 222 is a linear cylinder actuator, Moog Type A085, which is connected to control positioning of rod linkage 174 to the variable speed drive 172. A position sensor 224, a Moog positon feedback sensor, tracks positioning of actuator 222 and feeds back an error signal via 226 for input to servo amplifier 202. Pump 84 is torque-controlled in like manner as current converter 212 provides set point signal on line 216 to a servo amplifier 204. Servo output is then applied to a converter valve 228, and hydraulic fluid control via conduit 230 controls positioning of hydraulic servo actuator 232 and rod linkage 190 to variable speed drive 188. Position error of the hydraulic servo actuator is tracked by a position sensor 234 for feedback via line 236 for input to the servo amplifier 204.

The auto-selector 200 is set for low signal select to provide output on lead 206 of the most critical of the pressure or flow signals. Thus, pressure transmitter 116 (see FIG. 2), at the pipeline output of the vertical pump system provides indication on line 238 to a pressure indicator controller 240 which provides input to auto-selector 200. Feedback from the output of auto-selector 200 is applied by a lead 242 to the pressure indicator controller 240. The pressure transmitter 116 is commercially available from Bourns Corporation and is effective to transmit 4 milliamp indication for 0 PSI up to 20 milliamp indication for 1,000 PSI. The pressure indicator controller 240 is a Fisher Type TL-106 indicator controller which provides the requisite current output to the auto-selector 200.

The level transmitter 164 is located at the surface station on surge tank 138 (see FIG. 2) and may be such as a Drexelbrook Type C-508-29-1 level sensor which reads 0 to 100 percent fill over a range of 4 to 20 milliamps. The output from level transmitter 164 is then conducted via line 244 to the control panel and a Moore Type SCT current converter 246 which provides input to a level indicator controller 248, Fisher Type TL-106. Control output from the level indicator controller 248 is then set to be limited and output indication via lead 250 is applied as set point signal to a flow indicator controller 252. Such limitation represents allowable flow set point signals between 5100 and 6500 GPM, typically. Flow indicator controller 252, a Fischer Type TL-131, is effective from 0 to 8,000 gallons per minute as it also receives input via line 254 from the flow transmitter 80 (see also FIG. 2) sensing data at the input to the vertical pump system. Control line 254 is applied to a flow indicator 256 to provide panel display, as well as to a selected density controller 258 and flow alarm relays 260. The level transmitter 164 output is also applied to activate alarm relays 262 and a level indicator controller 264 which provides control output to a pneumatic valving system controlling minimum surge tank level.

The flow indicator controller 252 receives output from flow transmitter 80 as a signal ranging from 4-20 milliamps on lead 254. The level controller output on 250 is also applied along with auto-selector feedback on lead 266. Controller 252 then functions to select a signal for output to auto-selector 200 as it also receives input of the pressure signal from controller 240. Auto-selector 200, a low select device, provides set point output on lead 206 for subsequent control of pumps 82 and 84.

In operation, the process control system of FIG. 3 functions to maintain the slurry line flow rate up the borehole 28 at the pressure and flow rate that is compatible with the flow circuit. Thus, surge tank 138 level is monitored at the surface, pressure is monitored at a point in the underground pipeline prior to borehole entry, and the flow is monitored in the pipeline underground at a point prior to entry into the vertical pump system. The level, pressure and flow signal indications are then applied through auto-selector 200 to develop a set point signal that is appropriate for the most critical of the process signals, and such set point signal provides system control. If another of the monitored signals should become more critical, the transfer to control in response to that parameter is automatic through the auto-selector 200 as supplied by pressure indicator controller 240 and flow indicator controller 252.

Output from the auto-selector 200, the critical process control signal, is then applied through auto/manual station 208 and parallel current converters 210 and 212 to provide equal and isolated set point signals on leads 214 and 216 to respective servo amplifiers 202 and 204. Each of the servo amplifiers 202 and 204 then provide error-corrected output signal to their respective converter valves 218 and 228 for control of respective hydraulic servo actuators 222 and 232 so that variable speed drives 172 and 188 are maintained at essentially the same varied speeds. Thus, the remaining pumps 86–94 (FIG. 2) are allowed to operate in a constant speed capacity, and the variation compliant with slurry line load and pressures is maintained by tandem variation of the variable speed pumps 82 and 84.

The foregoing discloses a novel process control system for maintaining proper pressure and flow rate in a vertical slurry line of considerable length. Such borehole transduction may be maintained over very great heights, e.g. 850 feet, from the working level to the surface, and the control system in the present invention is capable of varying the total pump pressure output in accordance with the exigencies of the particular mining operation.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property of privilege is claimed are defined as follows:

1. Apparatus for moving fluid substance vertically through a defined flow way extending from a first level to a second level comprising:
   pump means disposed at said first level receiving fluid input and directing output fluid flow through a slurry line to said flow way;
   a prime mover providing output rotation;
   variable speed drive means coupling said rotation to drive said pump means and including a speed adjustment input;
   hydraulic actuator means connected to said speed adjustment input;
   means for sensing selected fluid pressure and flow rate parameters for said flow and generating respective first and second output signals;
   auto selector means receiving said respective first and second output signals and responsive to the lowest value signal to generate a set point signal; and
   servo control means responsive to said set point signal to control positioning of said hydraulic actuator means.

2. Apparatus as set forth in claim 1 wherein said means for sensing comprises:
   means for sensing fluid flow rate at the pump means fluid input; and
   means for sensing fluid pressure in the slurry line at the pump means output.

3. Apparatus as set forth in claim 1 which further includes:
   a surge tank at the second level;
   means for sensing instantaneous volume of fluid at the secod level surge tank and generating a third output signal; and
   flow indicator controller means receiving input of said third and second output signal to generate a low set point signal for input to said auto selector means in place of said second output signal.

4. Apparatus as set forth in claim 1 which further includes:
   position sensor means sensing instantaneous position of said hydraulic actuator means and generating an error signal for feedback input to said servo control means.

5. Apparatus as set forth in claim 1 which is further characterized in that:
   said flow way is an earth borehole; and
   said second level includes a surge tank for temporarily containing said fluid displaced from the borehole.

6. Apparatus for moving fluid substance vertically through a defined flow way extending from a first level to a second level comprising:
   pump means disposed at said first level receiving said fluid input and directing output fluid flow through a slurry line to said flow way;
   a prime mover providing output rotation;
   variable speed drive means coupling said rotation to drive said pump means and including a speed adjustment input;
   hydraulic actuator means connected to said speed adjustment input;
   means for sensing fluid flow rate at the pump means fluid input to generate a first output signal;
   means for sensing fluid pressure at the pump means fluid output to the slurry line and generating a second output signal;
   means for sensing instantaneous volume of fluid in a surge tank at the second level and generating a third output signal;
   flow indicator controller means receiving input of said first and third output signals to generate a low set point output;
   auto selector means receiving input of said second output signal and said low set point output signal and responsive to the lowest value signal to generate a second set point signal; and
   servo control means responsive to said second set point signal to control positioning of said hydraulic actuator means.

* * * * *